Jan. 10, 1939.   D. L. WOOD   2,143,813

FOCUSING LENS MOUNT

Filed March 15, 1938

Donald L. Wood
INVENTOR

BY
ATTORNEYS

Patented Jan. 10, 1939

2,143,813

UNITED STATES PATENT OFFICE 2,143,813

FOCUSING LENS MOUNT

Donald L. Wood, Rochester, N. Y., assignor to Eastman Kodak Company, Rochester, N. Y., a corporation of New Jersey Application March 15, 1938, Serial No. 196,030

5 Claims. (Cl. 88—57)

This invention relates to photography and more particularly to mounts for holding a series of lenses of an objective, one or more of said lenses being movably mounted with respect to the remaining lenses for focusing.

One object of my invention is to provide a lens mount in which the parts can be readily positioned in assembling the camera and in which the various parts of the mount are made to fit closely to prevent dust or dirt from entering between the lens elements. Another object of my invention is to provide a focusing lens mount in which the scale elements are carried on cooperating parts of the mount which fit closely so that the scale may always be accurately read. Still another object of my invention is to provide a focusing lens mount with scale elements carried by different parts of the mount, these parts being so arranged that in initially adjusting the objective to a camera, the scale can readily be positioned in the most desirable location and in which the stop which limits the movement of the focusing lens relative to the fixed lens elements of the objective is concealed so that there is but little chance of this adjustment being tampered with.

Coming now to the drawing wherein like reference characters denote like parts throughout:

Figure 1:
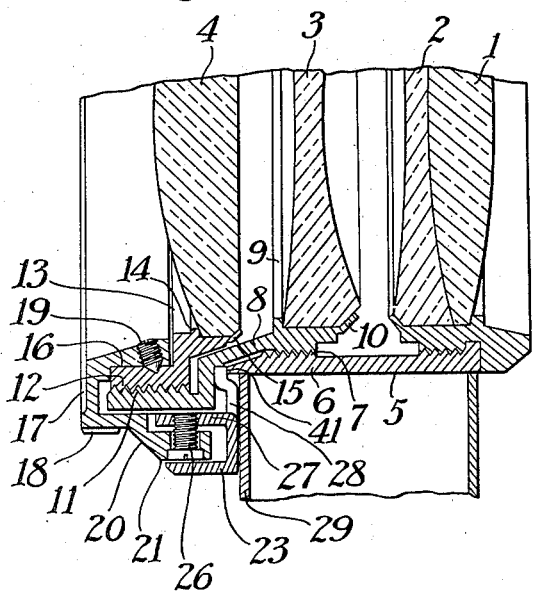
Fig. 1 is a fragmentary sectional view through a lens mount constructed in accordance with and embodying a preferred form of my invention.

In the present invention, the objective may be of any known type having a series of relatively fixed lens elements 1, 2 and 3 and having a movably mounted lens element 4 which is adjusted to and from the remaining lens elements for focusing the camera. All of these lens elements are carried by a lens barrel which may be formed of a plurality of annular parts which may be all joined together or which may be formed in two pieces, which is usually the case when the objective is to be mounted in a between-the-lens type of shutter. The lens barrel is broadly designated as 5 and in the present instance, this barrel consists of a plurality of parts. Part 6 is an annular member having a threaded engagement at 7 with the annular member 8, this member being provided with the usual flanges 9 and 10 which may be spun over on the lens element 3. On the outer end of the annular member 8, there is an internal thread 11 adapted to engage an external thread 12 on the focusing lens cell 13, this cell likewise having flanges 14 and 15 to hold the front lens element 4. In focusing the lens element 4, the threaded areas 11 and 12 move relative to each other to move the lens 4 axially with respect to the remaining lens elements.

In order to move this lens element and for other purposes which will be hereinafter more fully described, the lens cell 13 is provided with a cylindrical surface 16 which fits into a complementary-shaped cylindrical surface on the collar 17 which, as shown in Fig. 1, is preferably made substantially U-shaped in cross-section. Thus, the threaded areas 11 and 12 lie between the arms of the U-shaped member, and there is provided on an outer wall, a knurled area 18 by which the collar may be turned. This collar may be affixed to the front lens cell 13 in any desirable manner, as by set screws 19.

Figure 2:
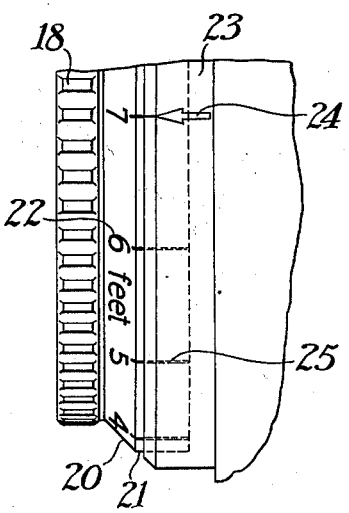
Fig. 2 is a fragmentary side elevation of a portion of the lens mount shown in Fig. 1.

One arm of the U-shaped member 17 is provided with a beveled surface 20 and with a cylindrical surface 21, both of these surfaces bearing graduations of a scale 22, as indicated in Fig. 2. A collar 23, which has an inner cylindrical surface closely fitting the cylindrical surface 21, is provided with an indicating mark 24 which serves as a pointer in connection with the graduations 22 to indicate the focal adjustment of the lens.

As will be noticed from Fig. 2, when a graduation is brought opposite the pointer, the scale graduation is accurately indicated because the pointer extends down close to the cylindrical surface 21 and it is immaterial how far in or out the front lens element may be screwed, because each graduation has an extended line 25 extending over the cylindrical surface 21 so that the pointer can always register.

Figure 3:
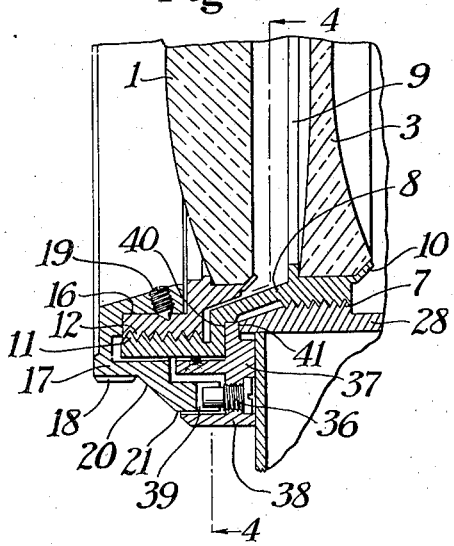
Fig. 3 is a view similar to Fig. 1, but showing a slightly different embodiment of my invention.
Figure 4:
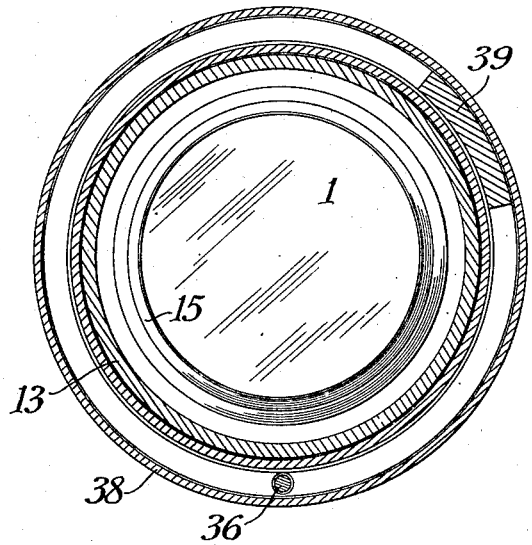
Fig. 4 is a fragmentary detail section taken on line 4—4 of Fig. 1 on a somewhat reduced scale.

One of the advantages of this construction is that regardless of the position of the focusing lens element, the parts are so arranged that the cylindrical surfaces 21 and the complementary surface on the collar 23 lie so close to each other that dirt and dust are prevented from entering between these parts. In order to form a stop to prevent the lens element 4 from being removed from the remaining elements, I may utilize a screw 26 passing through the cylindrical surface 21 and into the path of a lug 27 formed outwardly from the inner flange 28 of the collar which lies adjacent to the front wall 29 of the camera shutter. Such a screw is concealed throughout most of the range of movement when placed as in Fig. 1, but the form shown in Fig. 3 is somewhat more desirable, because the screw 36 passes through the base 37 of the collar 38 so as to engage a downwardly extending lug 39 on the annular member 17 and in this form the screw is always totally concealed. Thus, there is very little liability of this adjustment being displaced.

In both of the forms of my invention illustrated the collar 23 is held in place entirely by the lens mount. The sections 6 and 8 of the lens barrel are provided with a pair of clamping faces 40 and 41 which engage the extreme end of the flange 28.

The advantage of this construction is as follows: In initially focusing an objective of this type on a camera, the collar 23 or 37 is placed against the shoulder 41 and the lens cell 8 is screwed into position clamping the collar with the arrow 24 at the top or side of the camera, as may be desired. By tightly clamping down the cell 8, the collar is then held in a fixed position.

The lens cell 13 is then screwed back and forth on the threaded connections 11 and 12 until the focus is properly adjusted, after which the set screw 19 can be positioned to bring the proper scale graduation opposite the arrow 24. The objective is then in the proper position for use with all of the movable parts—that is, the threaded areas 11 and 12 and the stop screw 36 totally concealed.

With this adjustment, it is not necessary to use any additional parts or elements in initially setting up the objective for the particular camera on which it is mounted, because the two members carrying the scale elements—that is, the annular member 17 and the collar 23 or 37—can be adjusted relative to each other after the lens elements have been properly adjusted. By adjusting the collar 23, the pointer 24 may be located in the desired position. By adjusting the annular member 17, the proper graduation on the scale may be brought opposite to the pointer 24 without adjusting the focusing lens element. This provides, therefore, a very simple means of quickly and accurately placing a focusing type of objective on a camera having only a fixed extension, and moreover, provides a neat and relatively smooth external appearance which positively excludes dirt and dust from the interior of the lens barrel.

What I claim as new and desire to secure by Letters Patent of the United States is:

1. A focusing mount for objectives including a plurality of lens elements comprising a lens barrel, means for fixedly supporting lens elements therein, an internal thread on the barrel, an externally threaded cell carrying a focusing lens element for moving it relatively to said fixed elements, an annular member affixed to said cell substantially U-shaped in cross section and covering said threaded connection, a knurling in said annular member for turning it, a series of graduations carried by one of the U-shaped arms of the annular member, an annular collar including a cylindrical flange lying adjacent to and covering at least a portion of the graduations on the first member and bearing an indicating marking thereon in position to cooperate with any one of the series of graduations on the other annular member irrespective of the relative positions of the two members.

2. A focusing mount for objectives including a plurality of lens elements comprising a lens barrel, means for fixedly supporting lens elements therein, an internal thread on the barrel, an externally threaded cell carrying a focusing lens element for moving it relatively to said fixed elements, an annular member affixed to said cell substantially U-shaped in cross section and covering said threaded connection, a knurling in said annular member for turning it, a series of graduations carried by one of the U-shaped arms of the annular member, an annular collar including a cylindrical flange lying adjacent to and covering at least a portion of the graduations on the first member and bearing an indicating marking thereon in position to cooperate with any one of the series of graduations on the other annular member irrespective of the relative positions of the two members, and a stop concealed between the U-shaped annular member and the cylindrical flanged collar for limiting the movement of the U-shaped member in focusing the camera.

3. A focusing mount for objectives including a plurality of lens elements comprising a lens barrel, means for fixedly supporting lens elements therein, an internal thread on the barrel, an externally threaded cell carrying a focusing lens element for moving it relatively to said fixed elements, an annular member affixed to said cell substantially U-shaped in cross section and covering said threaded connection, a knurling in said annular member for turning it, a series of graduations carried by one of the U-shaped arms of the annular member, an annular collar including a cylindrical flange lying adjacent to and covering at least a portion of the graduations on the first member and bearing an indicating marking thereon in position to cooperate with anyone of the series of graduations on the other annular member irrespective of the relative positions of the two members, and means for holding the cylindrically flanged collar in a fixed position.

4. A focusing mount for objectives including a plurality of lens elements comprising a lens barrel including a plurality of annular threaded members at least two of which have clamping faces, means for fixedly supporting lens elements therein, an internal thread on the barrel, an externally threaded cell carrying a focusing lens element for moving it relatively to said fixed elements, an annular member affixed to said cell substantially U-shaped in cross section and covering said threaded connection, a knurling in said annular member for turning it, a series of graduations carried by one of the U-shaped arms of the annular member, an annular collar including a cylindrical flange lying adjacent to and covering at least a portion of the graduations on the first member and bearing an indicating marking thereon in position to cooperate with any one of the series of graduations in the other annular member irrespective of the relative positions of the two members, the annular collar member having an edge projecting between and being clamped by the clamping faces of two annular threaded members forming part of the lens barrel.

5. A focusing mount for objectives including a plurality of lens elements comprising a lens barrel, means for fixedly supporting lens elements therein, an internal thread on the barrel, an externally threaded cell carrying a focusing lens element for moving it relatively to said fixed elements, an annular member affixed to said cell substantially U-shaped in cross section and covering said threaded connection, an inner cylindrical surface on an inner arm of the U-shaped member, a smooth cylindrical surface on the front lens cell adapted to fit and complimentary in shape to the cylindrical surface on the U-shaped annular member, means for fastening the U-shaped annular member and front lens cylindrical surfaces in a fixed position whereby they can only turn together.

DONALD L. WOOD.